(12) United States Patent
Zhu

(10) Patent No.: US 9,564,093 B2
(45) Date of Patent: Feb. 7, 2017

(54) LIQUID CRYSTAL DISPLAY PANEL AND BLACK PICTURE INSERTION METHOD FOR THE PANEL DISPLAYED IN 3D MODE

(71) Applicant: Shenzhen China Star Optoelectronics Technology Co., Ltd., Shenzhen, Guangdong (CN)

(72) Inventor: Jiang Zhu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 91 days.

(21) Appl. No.: 14/427,634

(22) PCT Filed: Nov. 10, 2014

(86) PCT No.: PCT/CN2014/090739
§ 371 (c)(1),
(2) Date: Mar. 11, 2015

(87) PCT Pub. No.: WO2016/065669
PCT Pub. Date: May 6, 2013

(65) Prior Publication Data
US 2016/0127720 A1    May 5, 2016

(30) Foreign Application Priority Data
Oct. 31, 2014    (CN) .......................... 2014 1 0606475

(51) Int. Cl.
*G06F 3/038*    (2013.01)
*G09G 5/00*    (2006.01)
(Continued)

(52) U.S. Cl.
CPC ............ *G09G 3/3648* (2013.01); *G09G 3/003* (2013.01); *G09G 2310/0205* (2013.01);
(Continued)

(58) Field of Classification Search
CPC ................ G09G 3/3614; G09G 3/3648; G09G 2320/0257
See application file for complete search history.

(56) References Cited

U.S. PATENT DOCUMENTS

2005/0261883 A1* 11/2005 Shen .................... G09G 3/3648
703/13
2009/0179875 A1* 7/2009 Li ........................ G09G 3/3648
345/204
(Continued)

FOREIGN PATENT DOCUMENTS

CN    101325048 A    12/2008

*Primary Examiner* — Alexander Eisen
*Assistant Examiner* — Nan-Ying Yang
(74) *Attorney, Agent, or Firm* — Andrew C. Cheng

(57) ABSTRACT

An LCD panel includes multiple data lines, multiple scanning lines, multiple pixels, and multiple control transistors. Each pixel connected with a corresponding one of the data lines and one of the scanning lines. Gate electrodes of the control transistors are connected with a same scanning line. A source electrode of each control transistor is connected with a corresponding one of the data lines. Drain electrodes of the control transistors are connected with each other. A black picture insertion method for the LCD panel displayed in a 3D mode is also disclosed. Accordingly, a refresh frequency of the driving circuit is one half of the prior art. The power consumption and cost are reduced. Besides, a black picture is inserted into one frame during a blank time domain of the one frame such that the brightness is increased and the charge time of the liquid crystal capacitor is increased.

5 Claims, 1 Drawing Sheet

(51) Int. Cl.
*G09G 5/10* (2006.01)
*G09G 3/36* (2006.01)
*G09G 3/00* (2006.01)
*H04N 13/04* (2006.01)

(52) U.S. Cl.
CPC .............. *G09G 2310/0213* (2013.01); *G09G 2310/0251* (2013.01); *G09G 2310/0283* (2013.01); *G09G 2330/021* (2013.01); *H04N 13/0438* (2013.01)

(56) References Cited

U.S. PATENT DOCUMENTS

| | | | | |
|---|---|---|---|---|
| 2011/0292006 A1* | 12/2011 | Kim | ........................ | G09G 3/003 345/204 |
| 2011/0298779 A1* | 12/2011 | Chen | ........................ | G09G 3/344 345/212 |
| 2013/0229326 A1* | 9/2013 | Kamada | ............... | G09G 3/3648 345/32 |

* cited by examiner

LIQUID CRYSTAL DISPLAY PANEL AND BLACK PICTURE INSERTION METHOD FOR THE PANEL DISPLAYED IN 3D MODE

BACKGROUND OF THE INVENTION

1. Field of the Invention

The present invention relates to the liquid crystal display technology and more particularly to a liquid crystal display panel and a black picture insertion method when the panel is displayed in a 3D mode.

2. Description of Related Art

A three-dimension (3D) stereoscopic technology of a three-dimension (3D) stereoscopic television can be mainly divided into two types of a polarized type (active type) and a shutter type (passive type). Wherein, the shutter type synchronously switches a left-eye lens and a right-eye lens of a glass and a left-eye frame and a right-eye frame of an image on the television such that human eyes can receive different and fast switched frames so as to generate a stereoscopic image in the brain.

In the shutter type stereoscopic technology, when a left-eye frame and a right-eye frame are switching to display, a crosstalk problem is easily to generate. The crosstalk problem means: the left-eye frame received by the left eye includes the content of the right-eye frame, and the right-eye frame received by the right eye includes the content of the left-eye frame.

In order to eliminate the crosstalk problems, a black frame is inserted in the current shutter type stereoscopic technology. For example, the method utilizes a left-eye frame→black frame→right-eye frame→a black frame (LBRB) such that the left eye can receive the left-eye frame and the black frame simultaneously, and the right eye can receive the right-eye frame and the black frame simultaneously. Because the black frame is a background frame, the black frame and a normal frame will not generate a crosstalk. Inserting a black frame is known as a black-insertion (BI) technology, and is usually utilized in a flat display device in order to improve the display quality of the flat display device when displaying a dynamic image. The black-insertion technology inserts a black frame between two continuous frames in order to eliminate the integration effect to the eye. Furthermore, a moving screen response timing (MPRT) when the panel is displaying the dynamic image is improved so that the display quality is improved.

However, the black-insertion (BI) technology requires a higher refresh frequency. For a refresh frequency as 60 Hz for a left eye or a right eye, a refresh frequency is 240 Hz for a driving circuit of a flat display device using the black-insertion (BI) technology. The power consumption and the cost are increased. Besides, the diving method also causes the drawbacks of a lower brightness of the display screen and a shorter charge time for the liquid crystal capacitor.

SUMMARY OF THE INVENTION

To solve the above problem, an object of the present invention is to provide: a liquid crystal display panel, comprising: multiple data lines; multiple scanning lines; multiple pixels, each pixel connected with a corresponding one of the data lines and a corresponding one of the scanning lines; and multiple control transistors; wherein, a gate electrode of each control transistor is connected with a same scanning line; a source electrode of each control transistor is connected with a corresponding one of the data lines; each of the control transistors has a drain electrode, and the drain electrodes are connected with each other.

Wherein, each of the multiple pixels comprises a pixel transistor, a storage capacitor, and a liquid crystal capacitor; a gate electrode of each pixel transistor is connected with a corresponding one of the scanning lines; a source electrode of each pixel transistor is connected with a corresponding one of the data lines; terminals of each storage capacitor and each liquid crystal capacitor are both connected with a drain electrode of each pixel transistor; the other terminals of each storage capacitor and each liquid crystal capacitor are both connected with a common electrode.

Wherein, the drain electrode of each control transistor connects with a common electrode.

Wherein, the drain electrode of each control transistor connects with the common electrode.

Wherein, in a blank time domain of a (2n)th frame, the multiple control transistors and the multiple pixel transistors are all turned on, wherein, n is a positive integer.

Wherein, a scanning sequence of a (2n−1)th frame and a scanning sequence of a (2n)th frame are inverse.

Wherein, in a blank time domain of an nth frame, the multiple control transistors and the multiple pixel transistors are all turned on, wherein, n is a positive integer.

Wherein, a scanning sequence of the nth frame and a scanning sequence of a (n+1)th frame are the same; a scanning sequence of a (n+2)th frame and a scanning sequence of a (n+3)th frame are the same; a scanning sequence of a (n+1)th frame and a scanning sequence of a (n+2)th frame are inverse.

To solve the above problem, another object of the present invention is to provide: a black picture insertion method for a liquid crystal display panel when displaying in a three-dimension (3D) mode, wherein, the liquid crystal display panel includes: multiple data lines; multiple scanning lines; multiple pixels, each pixel connected with a corresponding one of the data lines and a corresponding one of the scanning lines; and multiple control transistors; wherein a gate electrode of each control transistor is connected with a same scanning line; a source electrode of each control transistor is connected with a corresponding one of the data lines; each of the control transistors has a drain electrode, and the drain electrodes are connected with each other; wherein, the black picture insertion method comprises: turning on all of the control transistors and pixel transistors in a blank time domain of a (2n)th frame, wherein, n is a positive integer.

Wherein, a scanning sequence of a (2n−1)th frame and a scanning sequence of the (2n)th frame are inverse.

To solve the above problem, another object of the present invention is to provide: a black picture insertion method for a liquid crystal display panel when displaying in a three-dimension (3D) mode, wherein, the liquid crystal display panel includes: multiple data lines; multiple scanning lines; multiple pixels, each pixel connected with a corresponding one of the data lines and a corresponding one of the scanning lines; and multiple control transistors; wherein a gate electrode of each control transistor is connected with a same scanning line; a source electrode of each control transistor is connected with a corresponding one of the data lines; each of the control transistors has a drain electrode, and the drain electrodes are connected with each other; wherein, the black picture insertion method comprises: turning on all of the control transistors and pixel transistors in a blank time domain of an nth frame, wherein, n is a positive integer.

Wherein, a scanning sequence of a nth frame and a scanning sequence of a (n+1)th frame are the same; a scanning sequence of a (n+2)th frame and a scanning sequence of a (n+3)th frame are the same; a scanning sequence of a (n+1)th frame and a scanning sequence of a (n+2)th frame are inverse.

The beneficial effects of the present invention: during the time of two frames, a complete 3D stereoscopic image is displayed. The refresh frequency of the driving circuit is one half of the refresh frequency of the prior art. The power consumption and cost are both reduced. In a blank time domain of one frame, a black picture is inserted such that the brightness is increased and the charge time of the liquid crystal capacitor is increased.

DETAILED DESCRIPTION OF THE PREFERRED EMBODIMENT

Figure 1:
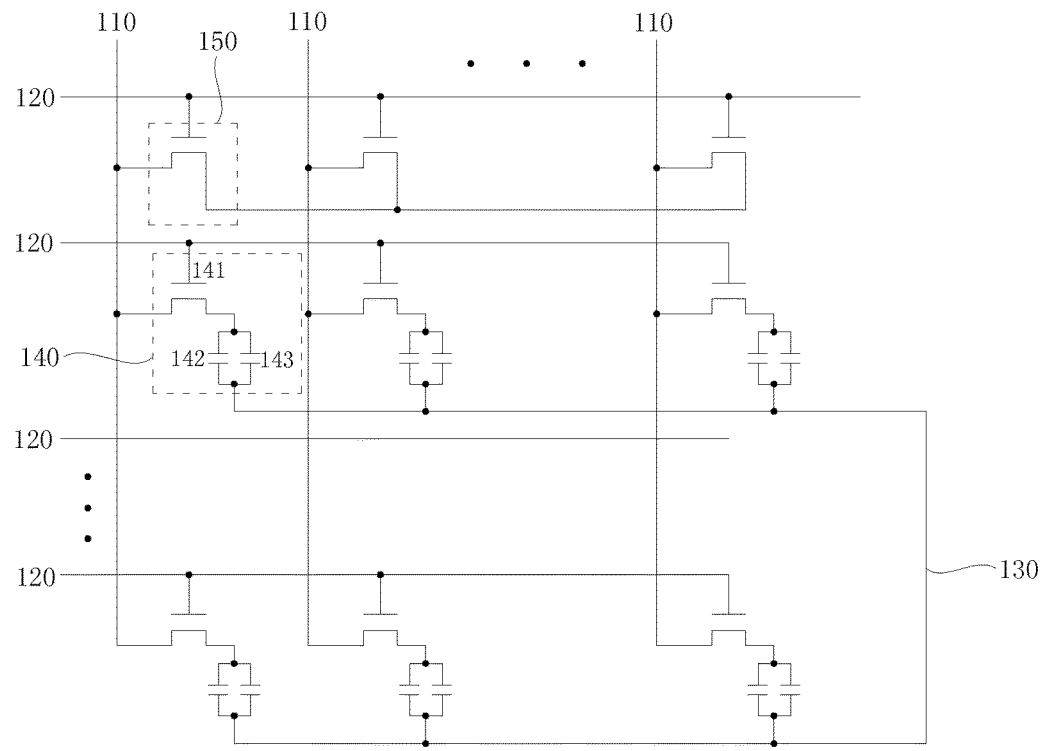
FIG. 1 is a schematic diagram of a liquid crystal display panel according to a first embodiment of the present invention.

FIG. 1 is a schematic diagram of a liquid crystal display panel according to a first embodiment of the present invention. With reference to FIG. 1, except the frame inversion, the polarity inversion method of the present invention can be a column inversion, a row inversion, or a dot inversion.

According to a first embodiment of the present invention, a liquid crystal display panel comprises: multiple data lines 110 for providing data signals, multiple scanning lines 120 for providing scanning signals, a common electrode 130, multiple pixels 140 defined by the multiple data lines 110 and the multiple scanning lines 120, and multiple control transistors 150. Wherein, each of the pixels connects with a corresponding data line 110 and a corresponding scanning line 120. Each of the control transistors 150 includes a gate electrode, a drain electrode, and a source electrode. Wherein, the gate electrodes are all connected with a same scanning line 120. The source electrode of each of the control switches 150 is connected with a corresponding data line 110. The drain electrodes of the control switches 150 are connected with each other. Except the first data line 110, the drain electrodes of the control switches 150 are connected with every data line 110. In this embodiment, the multiple control switches 150 are disposed at a first row. That is, the gate electrode of each control switch 150 connects with a first scanning line 120, In this embodiment, each of the pixels 140 comprises a pixel transistor 141, a storage capacitor 142, and a liquid crystal capacitor 143. Wherein, in each of the pixels 140, the gate electrode of the pixel transistor 141 is connected with a corresponding scanning line 120, a source electrode of the pixel transistor 141 is connected with a corresponding data line 110, terminals of the storage capacitor 142 and the liquid crystal capacitor 143 are both connected with the drain electrode of the pixel transistor 141. The other terminals of the storage capacitor 142 and the liquid crystal capacitor 143 are both connected with the common electrode 130.

In this embodiment, the pixel transistor 141 and the control transistor 150 are both thin-film transistors.

A back frame insertion method when the liquid crystal display panel is displaying in a 3D mode according to the first embodiment is described as following. It can be understand that the liquid crystal display panel according to the first embodiment can also perform a two-dimension (2D) display.

Table. 1 shows a black picture insertion method when the liquid crystal display panel is displaying in a 3D mode according to the first embodiment. In the Table. 1, n is a positive integer; symbol "↑" represents that the scanning direction (i.e. the scanning sequence) is from the last scanning line 120 to the second scanning line 120, symbol "↓" represents that the scanning direction (i.e. the scanning sequence) is from the second scanning line 120 to the last scanning line 120.

TABLE 1

| Frame number | 2n-1 | 2n | 2n + 1 | 2n + 2 |
|---|---|---|---|---|
| Scanning direction | ↑ | ↓ black picture | ↑ | ↓ black picture |
| Viewing eye | | left eye | | right eye |

From Table. 1, the liquid crystal display panel sequentially performs scanning from the last scanning line 120 to the second scanning line 120 in order to realize the display of a (2n−1)th frame. Then, the liquid crystal display panel sequentially performs scanning from the second scanning line 120 to the last scanning line 120 in order to realize the display of a (2n)th frame. Then, during a blank time domain of the (2n)th frame, turning on all thin-film transistors (that is, all pixel transistors 141 and control transistors 150) of the liquid crystal panel such that all data lines 110 are connected with the common electrode 130. At this time, on the liquid crystal display panel, a pixel voltage of each positive polarity pixel 140 is decreased, but a pixel voltage of each negative polarity pixel 140 is increased. Finally, the two pixel voltages reach a same voltage, that is, the finally voltage is very close to a voltage of the common electrode 130. As a result, the liquid crystal panel can realize the display of the black picture such that the left eye can see a complete 3D image.

The liquid crystal display panel sequentially performs scanning from the last scanning line 120 to the second scanning line 120 in order to realize the display of a (2n+1)th frame. Then, the liquid crystal display panel sequentially performs scanning from the second scanning line 120 to the last scanning line 120 in order to realize the display of a (2n+2)th frame. Then, during a blank time domain of the (2n+2)th frame, turning on all thin-film transistors (that is, all pixel transistors 141 and control transistors 150) of the liquid crystal panel such that all data lines 110 are connected with the common electrode 130. At this time, on the liquid crystal display panel, a pixel voltage of each positive polarity pixel 140 is decreased, but a pixel voltage of each negative polarity pixel 140 is increased. Finally, the two pixel voltages reach a same voltage, that is, the finally voltage is very close to a voltage of the common electrode 130. As a result, the liquid crystal panel can realize the display of the black picture such that the right eye can see a complete 3D image.

Table. 2 shows another pixel back insertion method when the liquid crystal display panel is executing a 3D display according to the first embodiment. In the Table. 2, m is a positive integer, symbol "↑" represents that the scanning direction (i.e. the scanning sequence) is from the last scanning line 120 to the second scanning line 120, symbol "↓" represents that the scanning direction (i.e. the scanning sequence) is from the second scanning line 120 to the last scanning line 120.

TABLE 2

| Frame number | m | m + 1 | m + 2 | m + 3 |
|---|---|---|---|---|
| Scanning direction | ↑ black picture | ↑ black picture | ↓ black picture | ↓ black picture |
| Viewing eye | left eye | right eye | left eye | right eye |

From Table. 2, the liquid crystal display panel sequentially performs scanning from the last scanning line 120 to the second scanning line 120 in order to realize the display of a (m)th frame. Then, during a blank time domain of the (m)th frame, all thin-film transistors are turned on (that is, all pixel transistors 141 and control transistors 150) of the liquid crystal panel such that all data lines 110 are connected with the common electrode 130. At this time, on the liquid crystal display panel, a pixel voltage of each positive polarity pixel 140 is decreased, but a pixel voltage of each negative polarity pixel 140 is increased. Finally, the two pixel voltages reach a same voltage, that is, the finally voltage is very close to a voltage of the common electrode 130. As a result, the liquid crystal panel can realize the display of the black picture.

Then, the liquid crystal display panel sequentially performs scanning from the last scanning line 120 to the second scanning line 120 in order to realize the display of a (m+1)th frame. Then, during a blank time domain of the (m+1)th frame, turning on all thin-film transistors (that is, all pixel transistors 141 and control transistors 150) of the liquid crystal panel such that all data lines 110 are connected with the common electrode 130. At this time, on the liquid crystal display panel, a pixel voltage of each positive polarity pixel 140 is decreased, but a pixel voltage of each negative polarity pixel 140 is increased. Finally, the two pixel voltages reach a same voltage, that is, the finally voltage is very close to a voltage of the common electrode 130. As a result, the liquid crystal panel can realize the display of the black picture. Therefore, the left eye and the right eye can individually see a frame image in order to generate a stereoscopic image synthesized by the frame images observed by the left and right eyes in the brain.

Then, the liquid crystal display panel sequentially performs scanning from the second scanning line 120 to the last scanning line 120 in order to realize the display of a (m+2)th frame. Then, during a blank time domain of the (m+2)th frame, turning on all thin-film transistors (that is, all pixel transistors 141 and control transistors 150) of the liquid crystal panel such that all data lines 110 are connected with the common electrode 130. At this time, on the liquid crystal display panel, a pixel voltage of each positive polarity pixel 140 is decreased, but a pixel voltage of each negative polarity pixel 140 is increased. Finally, the two pixel voltages reach a same voltage, that is, the finally voltage is very close to a voltage of the common electrode 130. As a result, the liquid crystal panel can realize the display of the black picture.

Then, the liquid crystal display panel sequentially performs scanning from the second scanning lines 120 to the last scanning line 120 in order to realize the display of a (m+3)th frame. Then, during a blank time domain of the (m+3)th frame, turning on all thin-film transistors (that is, all pixel transistors 141 and control transistors 150) of the liquid crystal panel such that all data lines 110 are connected with the common electrode 130. At this time, on the liquid crystal display panel, a pixel voltage of each positive polarity pixel 140 is decreased, but a pixel voltage of each negative polarity pixel 140 is increased. Finally, the two pixel voltages reach a same voltage, that is, the finally voltage is very close to a voltage of the common electrode 130. As a result, the liquid crystal panel can realize the display of the black picture. Therefore, the left and right eyes can respectively observe a frame image in order to generate a stereoscopic image synthesized by the frame images observed by the left and right eyes in the brain.

In summary, within a time of two screens, the left and right eye can respectively observe a complete 3D stereoscopic screen such that a refresh frequency of the driving circuit is only a half of a refresh frequency of the prior art. Accordingly, the power consumption and the cost are reduced simultaneously. Besides, the two black picture insertion methods also advantages of increasing the brightness of the screen and increasing the charging time of the liquid crystal capacitor.

Figure 2:
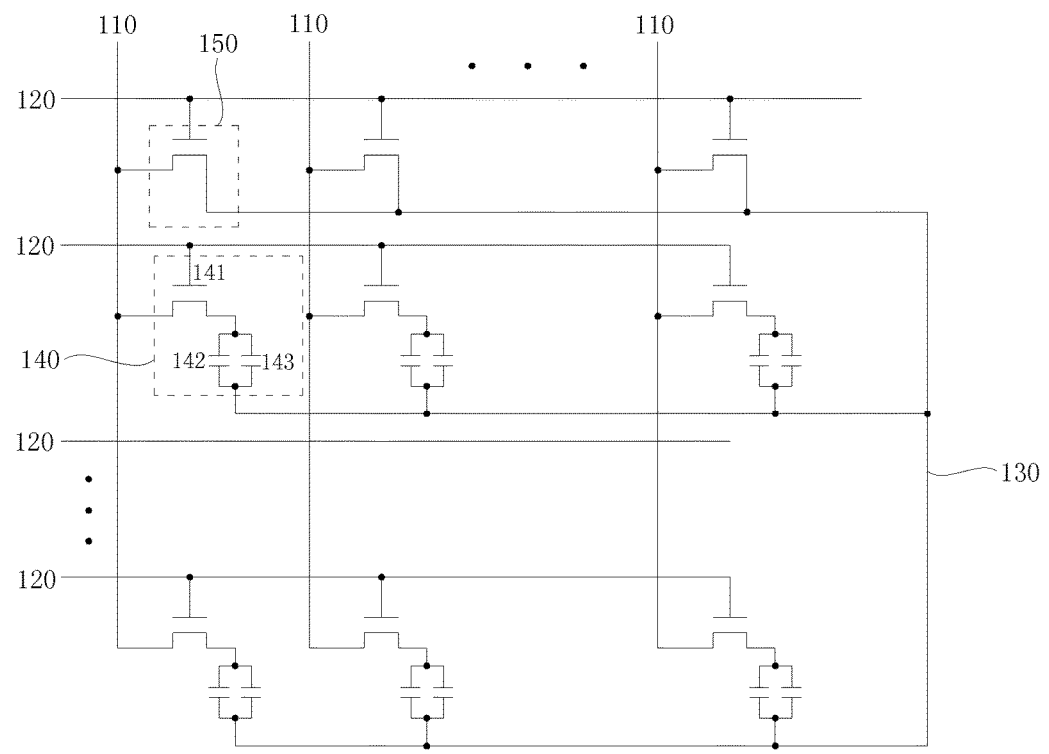
FIG. 2 is a schematic diagram of a liquid crystal display panel according to a second embodiment of the present invention.

FIG. 2 is a schematic diagram of a liquid crystal display panel according to a second embodiment of the present invention. The difference between the first embodiment and the second embodiment is described. With reference to FIG. 2, a drain electrode of each of the control transistors 150 is connected with the common electrode 130. Besides, the black picture insertion method of the second embodiment can utilizes the black picture insertion method as described in Table. 1 or Table. 2.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:
1. A liquid crystal display panel, comprising:
multiple data lines;
multiple scanning lines;
multiple pixels, each pixel connected with a corresponding one of the data lines and a corresponding one of the scanning lines; and
multiple control transistors;
wherein, a gate electrode of each control transistor is connected with a same scanning line; a source electrode of each control transistor is connected with a corresponding one of the data lines; each of the control transistors has a drain electrode, and the drain electrodes are directly connected with each other;
wherein, each of the multiple pixels comprises a pixel transistor, a storage capacitor, and a liquid crystal capacitor; a gate electrode of each pixel transistor is connected with a corresponding one of the scanning lines; a source electrode of each pixel transistor is connected with a corresponding one of the data lines; terminals of each storage capacitor and each liquid crystal capacitor are both connected with a drain electrode of each pixel transistor; the other terminals of each storage capacitor and each liquid crystal capacitor are both connected with a common electrode; and
wherein, the multiple control transistors are disposed outside the multiple pixels;
wherein, the drain electrode of each control transistor connects with a common electrode;
wherein, in a blank time domain of a (2n)th frame, the multiple control transistors and the multiple pixel transistors are all turned on such that all data lines are connected with the common electrode through the multiple control transistors so as to display a black picture, wherein, n is a positive integer; and wherein, a scanning sequence of a (2n−1)th frame and a scanning sequence of the (2n)th frame are inverse such that a left eye can see a complete 3D image.

2. The liquid crystal display panel according to claim 1, wherein, when displaying a frame, the liquid crystal display panel sequentially performs scanning for the multiple scanning lines which are connected with the pixel transistors.

3. A black picture insertion method for a liquid crystal display panel when displaying in a three-dimension (3D) mode, wherein, the liquid crystal display panel includes: multiple data lines; multiple scanning lines; multiple pixels, each pixel connected with a corresponding one of the data lines and a corresponding one of the scanning lines; and multiple control transistors; wherein a gate electrode of each control transistor is connected with a same scanning line; a source electrode of each control transistor is connected with a corresponding one of the data lines; each of the control transistors has a drain electrode, and the drain electrodes are directly connected with each other;

wherein, each of the multiple pixels comprises a pixel transistor, a storage capacitor, and a liquid crystal capacitor; a gate electrode of each pixel transistor is connected with a corresponding one of the scanning lines; a source electrode of each pixel transistor is connected with a corresponding one of the data lines; terminals of each storage capacitor and each liquid crystal capacitor are both connected with a drain electrode of each pixel transistor; the other terminals of each storage capacitor and each liquid crystal capacitor are both connected with a common electrode;

wherein, the multiple control transistors are disposed outside the multiple pixels; and wherein, the black picture insertion method comprises: turning on all of the control transistors and pixel transistors in a blank time domain of a (2n)th frame, wherein, n is a positive integer; and wherein, a scanning sequence of a (2n−1)th frame and a scanning sequence of the (2n)th frame are inverse such that a left eye can see a complete 3D image.

4. The black picture insertion method according to claim 3, wherein when displaying the (2n)th frame, the liquid crystal display panel sequentially performs scanning for the multiple scanning lines which are connected with the pixel transistors.

5. The black picture insertion method according to claim 3, wherein, the drain electrode of each control transistor connects with the common electrode such that in the blank time domain of the (2n)th frame, all data lines are connected with the common electrode through the multiple control transistors so as to display a black picture.

* * * * *